United States Patent [19]

Rossie et al.

[11] 4,417,419
[45] Nov. 29, 1983

[54] WINDOW ASSEMBLY FOR AUTOMOTIVE VEHICLES

[75] Inventors: Egbert Rossie, Ingolstadt; Michael Hahn, Kösching; Lutz Schemperg, Kipfenberg, all of Fed. Rep. of Germany

[73] Assignee: Audi NSU Auto Union AG, Neckarsulm, Fed. Rep. of Germany

[21] Appl. No.: 159,398

[22] Filed: Jun. 13, 1980

[30] Foreign Application Priority Data

Jun. 14, 1979 [DE]   Fed. Rep. of Germany ....... 2924309

[51] Int. Cl.³ ............................................. E05F 11/48
[52] U.S. Cl. ...................................... 49/348; 49/374; 49/485; 49/502; 49/440
[58] Field of Search ................. 49/502, 374, 437, 375, 49/490, 491, 483, 485, 497, 227

[56] References Cited

U.S. PATENT DOCUMENTS

| | | | |
|---|---|---|---|
| 3,363,364 | 1/1968 | Cadiou | 49/490 |
| 4,114,320 | 9/1978 | Pullan | 49/491 |
| 4,240,227 | 12/1980 | Hasler et al. | 49/374 X |

Primary Examiner—Kenneth Downey
Attorney, Agent, or Firm—Karl F. Ross

[57] ABSTRACT

A window-guiding and sealing assembly for use particularly in a door of a passenger-type automotive vehicle having a window frame comprises a guide member directly attached to the window along a substantially vertical edge thereof and projecting into the interior of the vehicle, this guide member being slidably mounted in a vertical guide rail on the vehicle body. A hollow substantially oval sealing strip is integrally formed with a holder having a resilient clip for forming a snap-lock engagement with a flange and a recess along the members of the window frame, the holder having a guide surface on a horizontal portion for facilitating the engagement of an upper part of the window pane and a horizontal section of the sealing strip upon a closing of the window assembly. The holder is further provided along its entire length with an inwardly facing shoulder for engaging another hollow sealing strip attached to the door frame. The sealing strip on the window frame has a lip along its top or horizontal section for bridging the gap between the upper member of the window frame and the door frame.

10 Claims, 3 Drawing Figures

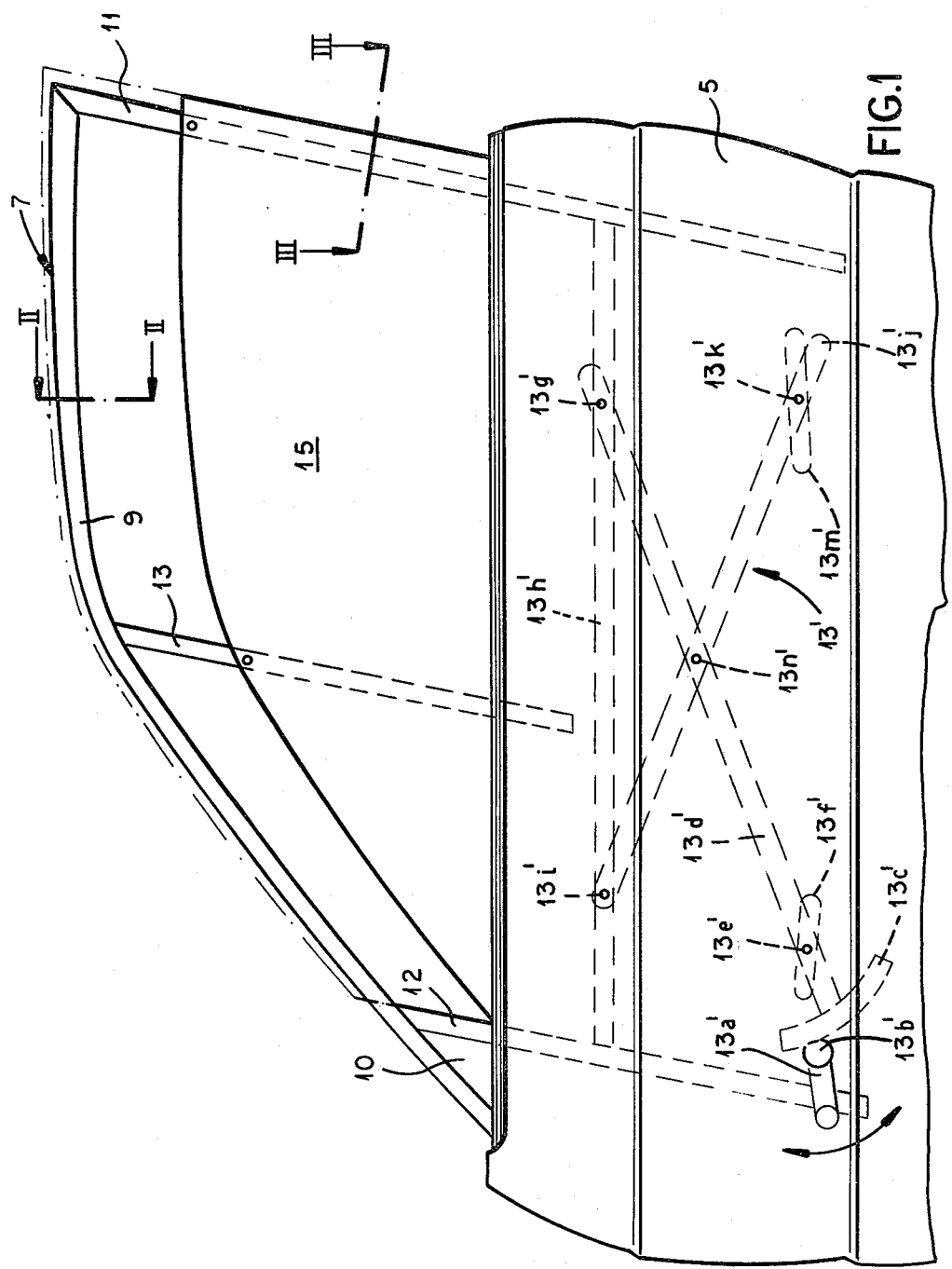

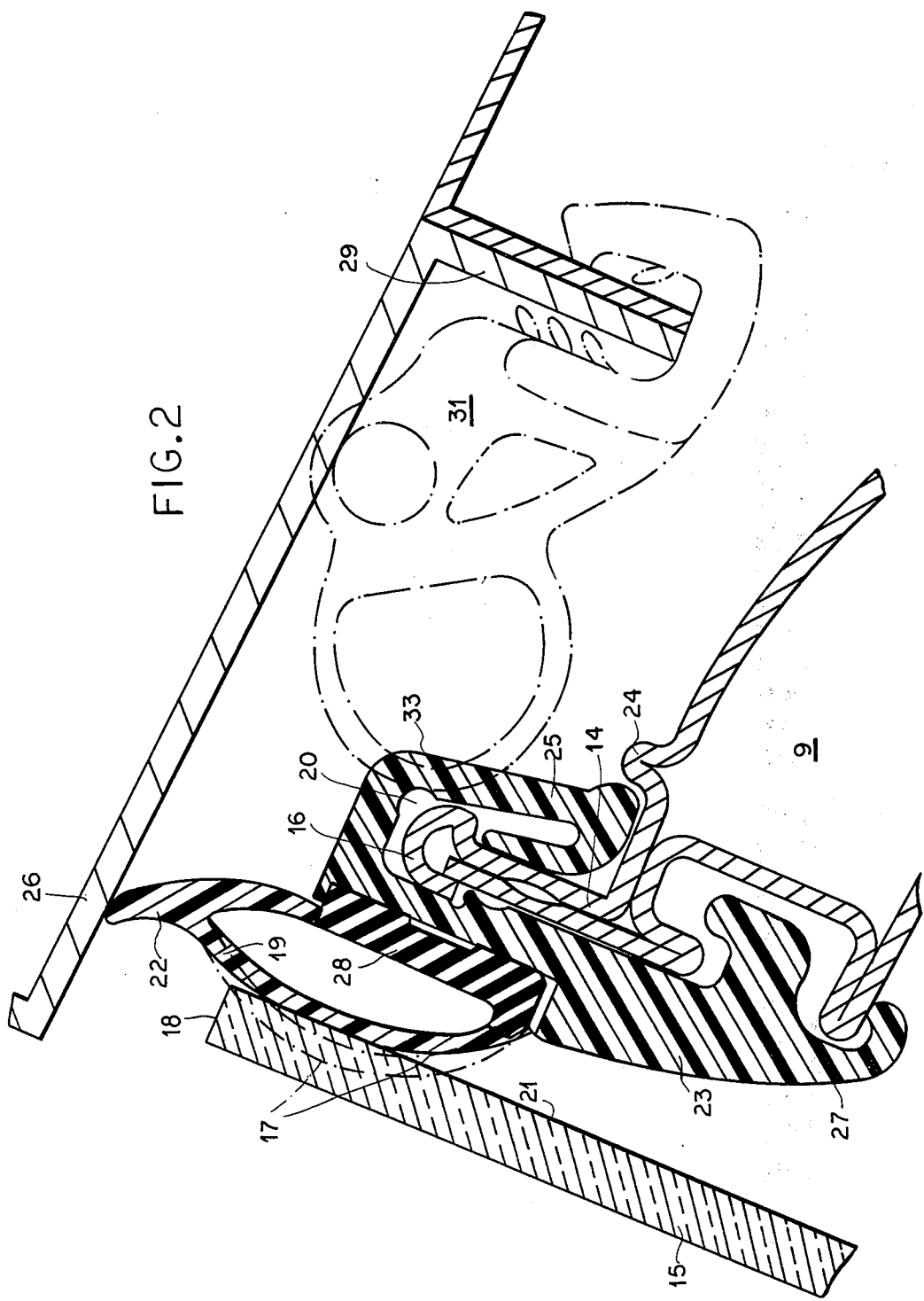

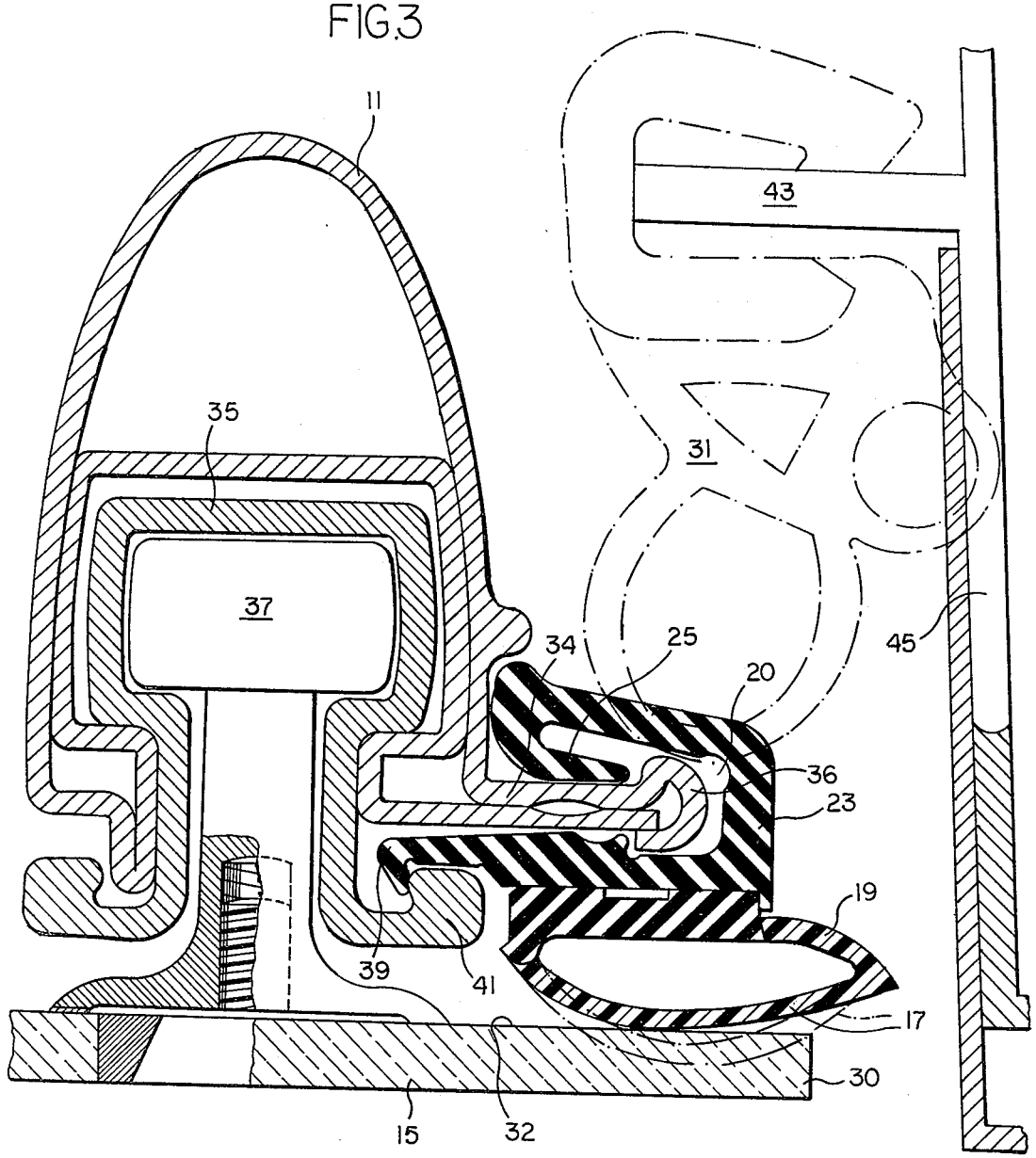

WINDOW ASSEMBLY FOR AUTOMOTIVE VEHICLES

CROSS-REFERENCE TO RELATED APPLICATION

The present application is related to commonly owned copending U.S. patent application Ser. No. 017,833 filed Mar. 6, 1979, now U.S. Pat. No. 4,240,227.

FIELD OF THE INVENTION

Our present invention relates to a window assembly in automotive vehicles. More particularly, our present invention relates to an assembly for guiding and sealing a lowerable window pane in an automotive passenger vehicle.

BACKGROUND OF THE INVENTION

In a window assembly such as described in the above-mentioned application, a sealing strip is fastened to a member of a window frame for forming a seal between this member and a portion of a door frame. Such a sealing strip is subjected to varying loads and stresses due, for example, to closing the door or the window and to bending of the window pane upon vehicular motion at high speeds. Unpredictable pulling and squeezing of the sealing strip arises particularly in cases of a poorly mounted door. Consequences include a shortened seal life and greater resistance to door closing.

In such a window assembly the frame member includes another strip for forming a seal between the window and the window frame. The frame member thus serves as both frame member and seal mount and is formed as a single extruded piece. Because the frame member must have recesses and projections to enable the fitting of the seals, it is difficult and costly to produce.

OBJECT OF THE INVENTION

The object of our present invention is to provide an improved window-guiding and -sealing assembly in which the window pane forms a smooth outer surface with the vehicle body, in which loading stresses on sealing strips are reduced and which is economical to produce.

SUMMARY OF THE INVENTION

A window assembly for an automotive vehicle having a body comprises according to our present invention a window pane adapted to be raised and lowered into the body and having at least one substantially vertical edge and a substantially horizontal top edge, a substantially vertical guide rail mounted on the body and disposed along the vertical window edge, and at least one guide member directly fixed to the pane along a face thereof turned toward the interior of the vehicle and disposed inwardly of the vertical edge, whereby a continuous zone on the inner window-pane face and along the vertical window edge is formed without obstruction. The guide member is at least partially surrounded by the guide rail and slidably mounted therein for vertical reciprocation under the control of an actuator mounted on the body for raising and lowering the window pane. A first elongate seal on the body directly engages the continuous zone on the inner window face at least in a closed state of the assembly, while a second elongate seal on the body engages the top edge of the pane in the closed assembly state, the second seal including a guide surface extending below the respective sealing strip and facing toward the exterior of the vehicle for directing the pane into a position of engagement with the sealing strip upon an upward or closing stroke of the window pane.

An advantage of the window-pane guide surface on the second or horizontal seal is to ensure an effective engagement of the top of the pane and the sealing strip. In addition, the direction of engagement, and thus the loading stresses on the sealing strip, is rendered constant, whereby the effective seal life is increased.

According to another feature of our present invention, the vehicle body has a flange with an enlarged head portion extending parallel to the window top edge at least in a closed state of the assembly, the second seal including an elongate resilient holder attached to the respective sealing strip and provided with a recess for receiving the flange. Preferably, the holder or seal carrier has a clip or catch projection snapping into a recess formed on the vehicle body in the region of the flange.

A window assembly according to our present invention is particularly effective in a car door, the door being mounted in a door frame on the vehicle body. The window assembly then includes a window frame mounted on the door and having a substantially horizontal member defining the top of the door. The second seal is attached to this horizontal member and includes an upwardly extending lip elongate in the horizontal direction for engaging the door frame in a closed state of the window assembly. The lip presents an insignificant resistance to closing the door and bridges the gap between the horizontal window-frame member and the top of the door frame, thereby serving to damp wind noises and to prevent water from entering the window-door frame gap.

According to another feature of our present invention, a third elongate seal is mounted along a top edge of the door frame and the seal holder has a shoulder facing substantially toward the interior of the vehicle for engaging the third seal in a closed state of the door assembly. Preferably this third seal is a hollow strip with a curvilinear outer surface facing toward the vehicle exterior, such curved or cylindrical surface together with the shoulder of the seal holder ensuring compression of the hollow strip in a predetermined direction. This control of the loading and straining of the hollow sealing strip facilitates an increase in seal life.

In the event that the guide rail is formed as a vertical window-frame member connected to the upper horizontal member, the first and second seals are advantageously formed as a continuous strip or single body with a common holder or carrier. The seals and the holder are then a single unit which can be economically produced and easily mounted on the window frame. The rail has an additional flange with its own enlarged head portion extending substantially parallel to the rail, the holder engaging this additional flange in a snap-lock fit. Alternatively viewed, the holder includes a clip or resilient projection which snaps into recesses formed on the window frame; the engagement of the clip and the recesses can be easily monitored to ensure the formation of an effective lock.

According to further features of our present invention, the seals are substantially oval in cross section, whereby a curved surface is presented for engagement with inner window-pane surfaces. The guide rail is provided with an insert in the form of a channel or hollow bar with a slit facing the window, this channel receiving the guide member at least in part for reducing friction forces acting thereon. The channel may be made of a friction-reducing substance such as thermoplastic resin.

BRIEF DESCRIPTION OF THE DRAWING

These and other features of our present invention will now be described in detail, reference being made to the accompanying drawing in which:

FIG. 1 is a partially schematic side-elevational view of a car door having a window assembly according to our present invention;

FIG. 2 is a partial cross-sectional view taken along line II—II in FIG. 1; and

FIG. 3 is a partial cross-sectional view taken along line III—III in FIG. 1.

SPECIFIC DESCRIPTION

FIG. 1 is a diagrammatic representation of the left front door of an automobile provided with a door body 5 and a window frame 7.

A scissor linkage 13' shown in broken lines in the door body and only diagrammatically, is provided to raise and lower the window 15 in the window frame 7. The linkage 13' may be any conventional window-actuating mechanism and can, for example, include a handle 13a' along the inner wall of the door which drives a pinion 13b' which rotates a sector 13c' attached to one arm 13d' having a pin 13e' guided in a slot 13f'. The arm 13d' is hinged at 13g' to a metal bar 13h' formed along the lower edge of the window pane 15 and to which is pivotally joined at 13i' another bar 13j' whose pin 13k' is guided in a slot 13m'. The links 13j' and 13d' are pivotally connected at 13n' and the bar 13h' may be slotted to receive the pins 13g' and 13i'.

Thus when the handle 13a' is cranked, the window can be lowered into the position shown in solid lines (open position) or raised into the dot-dash line position.

The window frame 7 is formed with an upper shank 9, a rear upright shank 11 which can be parallel to a forward shank 12. In the small triangular region represented at 10, left between the upper frame member 9 and the frame member 12, a rearview mirror can be mounted. An additional upright frame member or guide rail 13 similar in form to member 11 may extend from a bending point in the upper member 9, about two-fifths of the distance from forward member 12 to rear member 11.

The frame members 9, 11, 12, 13 all are constituted, in the usual way, of sheet metal profiles, i.e. sheet metal members which are bent into a channel or tubular configuration (see FIGS. 2, 3). Naturally they can be deep drawn members of the inner sheet-metal or outer sheet-metal walls of the door, can be separate pieces attached to the door, or can be extruded synthetic resin or metal profile members.

As illustrated in FIG. 2, upper window-frame member 9 is formed with a vertical flange 14 having an enlarged head portion 16 extending parallel to a top edge 18 of window pane 15 at least in a closed position or state thereof shown in FIG. 2. An elongate hollow seal 19 having a generally oval cross section is cemented to a carrier or holder element 23. Element 23 forms an elongate clip-type fastener having a cavity 20 defined by a resilient locking or catching projection 25. Flange 14 together with its head 16 is received in cavity 20 in a snap-lock engagement, a head of projection 25 fitting into a groove formed by flange head 16 and a parallel ridge 24 on frame member 9.

Upon an upward or raising stroke of window pane 15, seal 19 is squeezed from a neutral or unengaged position, represented in FIG. 2 by dot-dash lines, to a sealing position (solid lines) in which a sealing surface 17 of hollow strip 19 engages an inwardly facing surface 21 of pane 15. Sealing-strip holder 23 is provided with a glide surface 27 for smoothly guiding the upper end of pane 15 into a sealing engagement with strip 19. This strip includes an upwardly projecting elongate lip 22 for forming a seal with an upper member 26 of a door frame in which door 5 is mounted on the body of the vehicle.

Door-frame member 26 has a downwardly projecting flange 29 on which an additional sealing strip 31 is mounted for engaging a shoulder 33 of resilient holder 23, this shoulder facing substantially toward the interior of the vehicle. As indicated in FIG. 2, seal 19 and holder 23 are advantageously formed as extruded thermoplastic resin but may also be flexible metal pieces. Seal 19 has a rubber base 28 which is bonded to the holder.

As shown in FIG. 3, upright frame member 11 is formed as a channel into which another channel or hollow rail 35 is inserted. A guide member 37 bonded or bolted to window pane 15 at a distance from a vertical edge 30 thereof is slidably mounted in rail 35 for vertical reciprocation therein under the action of actuating mechanism 13' (FIG. 1). Window-frame member 11 is provided with a substantially vertical flange 34 with an enlarged head portion 36 extending parallel to edge 30. Flange 34 and head 36 are received into recess 20 of seal holder 23 in a snap-lock engagement, seal strip 19 and holder 23 preferably forming a continuous body extending around the periphery of window frame 7, i.e. along upper frame member 9 and rear upright 11. As indicated in FIG. 3, however, holder 23 has no glide surface in the region of upright 11 and sealing strip 19 has no lip for forming an engagement with a rear upright door-frame member or post 45. Glide surface 27 (FIG. 2) functions to facilitate the engagement of window pane 15 and a horizontal portion of elongate seal 19, the pane and the horizontal seal portion being unengaged in an open state of the window assembly; owing to continuous engagement of window pane 15 and at least part of a vertical portion of seal 19, there is no need to form holder or carrier 23 with a glide surface in the region of the rear upright window-frame member. Lip 22 serves to deflect water falling or trickling from the roof of the vehicle and to prevent this water from entering the space between the top of the door and the upper door-frame member 26, As indicated in FIG. 3, seal 31 is advantageously also a continuous body lining the door frame and is attached to a flange 43 of post 45. Seal 31, like seal 19, is preferably extruded thermoplastic resin or rubber. It is to be noted that sealing surface 17 of hollow strip 19 engages pane 15 at least in part along a vertical zone 32 formed without obstruction between guide member 37 and vertical edge 30.

In the region of upright window-frame member 11 sealing-strip holder 23 is provided with an outwardly turned rib 39 which forms a snap lock with an elongate hook or catch rib 41 on rail guide 35.

A window utilizing an assembly according to our present invention is able to form a smooth outer surface with surrounding vehicle-body parts, all the window- and door-frame seals being formed on the inside of the window rather than on outside edges.

We claim:

1. A window assembly for an automotive vehicle having a body, comprising:
   a window pane adapted to be raised and lowered into said body and having at least one substantially vertical edge and a substantially horizontal top edge;
   a substantially vertical guide rail mounted on said body and disposed along said vertical edge;
   at least one guide member directly fixed to said pane along a face thereof turned toward the interior of said vehicle and disposed inwardly of said vertical edge, whereby a continuous zone on said face and along said vertical edge outwardly of said guide member is formed without obstruction, said guide member being at least partially surrounded by said rail and slidably mounted therein for vertical reciprocation;
   first sealing means including a first elongate seal on said body for directly engaging said zone of said face at least in a closed state of the window assembly;
   second sealing means including a second elongate seal extending horizontally on said body for engaging said pane along said top edge in said closed state, said second sealing means including a guide surface extending below and parallel to said second elongate seal and facing toward the exterior of said vehicle for directing said pane toward a position of engagement with said second elongate seal upon an upward stroke of said pane; and
   actuating means on said body for raising and lowering said pane with said guide member guided by said rail.

2. The assembly defined in claim 1 wherein said body has a flange with an enlarged head portion extending parallel to said top edge at least in a closed state of the window assembly, said second sealing means including an elongate resilient holder attached to said second elongate seal and provided with a recess receiving said flange in a snap-lock engagement.

3. The assembly defined in claim 2, wherein said vehicle has a door mounted in a door frame on said body, further comprising a window frame mounted on said door and having a substantially horizontal member defining the top of said door, said second elongate seal including an upwardly extending lip on said horizontal member for engaging the door frame in a closed state of said door.

4. A window assembly for an automotive vehicle having a body comprising:
   a door mounted in a door frame on said body;
   a window pane adapted to be raised and lowered into said body and having at least one substantially vertical edge and a substantially horizontal top edge;
   a substantially vertical guide rail mounted on said body and disposed along said vertical edge;
   at least one guide member directly fixed to said pane along a face thereof turned toward the interior of said vehicle and disposed inwardly of said vertical edge, whereby a continuous zone on said face and along said vertical edge outwardly of said guide member is formed without obstruction, said guide member being at least partially surrounded by said rail and slidably mounted therein for vertical reciprocation;
   first sealing means including a first elongate seal on said body for directly engaging said zone of said face at least in a closed state of the window assembly;
   second sealing means including a second elongate seal extending horizontally on said body for engaging said pane along said top edge in said closed state, said second sealing means including a guide surface extending below and parallel to said second elongate seal and facing toward the exterior of said vehicle for directing said pane toward a position of engagement with said second elongate seal upon an upward stroke of said pane;
   actuating means on said body for raising and lowering said pane with said guide member guided by said rail, said body having a flange with an enlarged head portion extending parallel to said top edge at least in a closed state of the window assembly, said second sealing means including an elongate resilient holder attached to said second elongate seal and provided with a recess receiving said flange in a snap-lock engagement;
   a window frame mounted on said door and having a substantially horizontal member defining the top of said door, said second elongate seal including an upwardly extending lip on said horizontal member for engaging said door frame in a closed state of said door; and
   a third elongate seal mounted along a top edge of said door frame, said holder having a shoulder facing substantially toward the interior of said vehicle for engaging said third elongate seal in a closed state of said door.

5. The assembly defined in claim 4, wherein said rail forms at least a portion of a vertical member of said window frame, said rail having an additional flange with an additional enlarged head portion extending substantially parallel to said rail, said first sealing means including an additional elongate resilient holder attached to said first elongate seal and provided with a recess receiving said additional flange in a snap-lock engagement.

6. The assembly defined in claim 5 wherein the holders of said first and said second sealing means are integrally formed.

7. The assembly defined in claim 6 wherein said first elongate seal and said second elongate seal are integrally formed.

8. The assembly defined in claim 5, further comprising a fourth elongate seal mounted along a vertical edge of said door frame, said additional elongate resilient holder having a shoulder facing substantially toward the interior of said vehicle for engaging said fourth seal in a closed state of said door.

9. The assembly defined in claim 5 wherein said rail is provided with an insert receiving said guide member for in part reducing friction forces acting thereon.

10. The assembly defined in claim 5 wherein said first seal and said second seal are substantially oval in cross section.

* * * * *